(12) United States Patent  (10) Patent No.: US 8,811,006 B2
Huang  (45) Date of Patent: Aug. 19, 2014

(54) USB MEMORY STICK WITH A HINGED SAFETY HOOK

(75) Inventor: Joseph Huang, Taoyuan (TW)

(73) Assignee: Ho E Screw & Hardware Co., Ltd., Lu-Chu, Taoyuan (TW)

( * ) Notice: Subject to any disclaimer, the term of this patent is extended or adjusted under 35 U.S.C. 154(b) by 237 days.

(21) Appl. No.: 13/441,067

(22) Filed: Apr. 6, 2012

(65) Prior Publication Data

US 2013/0265709 A1  Oct. 10, 2013

(51) Int. Cl.
*G06F 1/16*  (2006.01)

(52) U.S. Cl.
USPC .................. 361/679.31; 439/135; 361/697.03

(58) Field of Classification Search
None
See application file for complete search history.

(56) References Cited

U.S. PATENT DOCUMENTS

| 124,556 | A | * | 3/1872 | Dyer | 24/581.12 |
| 2,550,038 | A | * | 4/1951 | Brown | 59/85 |
| D176,477 | S | * | 12/1955 | Oldak | D3/207 |
| 6,786,743 | B2 | * | 9/2004 | Huang | 439/131 |
| D513,000 | S | * | 12/2005 | Cohen | D14/480.3 |
| D524,038 | S | * | 7/2006 | Leung | D3/208 |
| 7,473,112 | B2 | * | 1/2009 | Zhu et al. | 439/142 |
| 7,503,780 | B1 | * | 3/2009 | Huang | 439/135 |
| 7,544,073 | B2 | * | 6/2009 | Nguyen et al. | 439/135 |
| 7,794,246 | B2 | * | 9/2010 | Cheng | 439/138 |
| D640,263 | S | * | 6/2011 | Huang | D14/480.3 |
| 8,029,299 | B1 | * | 10/2011 | Huang | 439/135 |
| D653,207 | S | * | 1/2012 | Vandiver | D13/108 |
| 8,192,211 | B1 | * | 6/2012 | Huang | 439/131 |
| 2003/0223286 | A1 | * | 12/2003 | Lee | 365/200 |
| 2005/0277316 | A1 | * | 12/2005 | Cohen | 439/135 |
| 2006/0073717 | A1 | * | 4/2006 | Ng et al. | 439/131 |
| 2007/0017266 | A1 | * | 1/2007 | Huang | 70/459 |
| 2007/0171620 | A1 | * | 7/2007 | Lee | 361/737 |
| 2008/0276099 | A1 | * | 11/2008 | Nguyen et al. | 713/186 |
| 2008/0280490 | A1 | * | 11/2008 | Nguyen et al. | 439/607 |
| 2010/0053859 | A1 | * | 3/2010 | Chang | 361/679.01 |
| 2010/0238622 | A1 | * | 9/2010 | Yu et al. | 361/679.32 |
| 2010/0321878 | A1 | * | 12/2010 | Huang | 361/679.31 |
| 2012/0033414 | A1 | * | 2/2012 | Sharrah et al. | 362/183 |
| 2012/0295472 | A1 | * | 11/2012 | McSweyn | 439/501 |

FOREIGN PATENT DOCUMENTS

| TW | D135636 | 7/2009 |
| TW | D143014 | 2/2011 |
| TW | D140681 | 5/2011 |
| TW | M418377 | 6/2011 |
| TW | D143015 | 10/2011 |

* cited by examiner

*Primary Examiner* — Adrian S Wilson
(74) *Attorney, Agent, or Firm* — Guice Patents PLLC

(57) ABSTRACT

A USB memory stick includes comprises a casing comprising opposing top and bottom sides and a bottom opening in said bottom side, a PC board comprising a USB interface circuit and a memory chip package, a tray holding the PC board in the casing, a safety hook for fastening to a belt or strip-like object, and a hinge coupled between the casing and the safety hook for allowing a limited angle of rotation between the casing and the safety hook.

10 Claims, 6 Drawing Sheets

USB MEMORY STICK WITH A HINGED SAFETY HOOK

BACKGROUND OF THE INVENTION

1. Field of the Invention

The present invention relates to memory stick technology and more particularly, to a USB memory stick with a hinged safety hook that is electrically connectable to a computer for data access and facilitates carrying.

2. Description of the Related Art

A USB memory stick is a mobile data storage device convenient for carrying and connectable to a computer for data access. Following development of data storage technology, USB memory stick storage capacity has been greatly expanded for wide field applications, and many USB memory stick circuit board specifications, including USB 2.0, mini USB 2.0 and USB 3.0 have been created. The latest USB 3.0 greatly reduces the size.

Memory sticks are so small that can easily be lost. To prevent loss and to facilitate carrying, a USB memory stick may be equipped with a lock. Similar designs are seen in Taiwan Utility M418377, "Memory stick having a lock device", which is issued to the present inventor; Taiwan Utility D143014, "Buckle type memory stick (I)"; Taiwan Utility D143015, "Buckle type memory stick (II)"; Taiwan Utility D140681, "Memory stick"; Taiwan Utility D135636, "Memory stick".

However, in the aforesaid various prior art designs, the lock device or buckle is fixedly located at the casing and not directionally adjustable to fit different application requirements.

SUMMARY OF THE INVENTION

The present invention has been accomplished under the circumstances in view. It is the main object of the present invention to provide a USB memory stick with a hinged safety hook, which facilitates carrying and prevents loss.

To achieve this and other objects of the present invention, a memory stick with a hinged safety hook comprises a casing comprising opposing top and bottom sides and a bottom opening in said bottom side, a PC board comprising a USB interface circuit and a memory chip package, a tray holding the PC board in the casing, a safety hook for fastening to a belt or strip-like object, and a hinge coupled between the casing and the safety hook for allowing a limited angle of rotation between the casing and the safety hook.

Further, the hinge comprises first and second barrels located at the top side of the casing, a third barrel located at the safety hook and inserted in between the first and second barrels, and a pivot shaft connecting the first and second barrels and the third barrel for allowing the third barrel to be turned with the safety hook relative to the casing within a predetermined angle. The pivot shaft comprises an embossed end portion engaged in the second barrel. The second barrel comprises an end block stopping against the embossed end portion of the pivot shaft.

Further, the safety hook comprises a hollow hook head, a curved hook body extended from one end of the hollow hook head, a hook mouth defined between a distal end of the hollow hook head and a distal end of the curved hook body, a coiled spring member mounted inside the hollow hook head, a latch supported on the coiled spring member and forced by the coiled spring member to stop against the distal end of the curved hook body to close the hook mouth, and an operating handle slidably inserted through the coiled spring member in the hook head and fixedly connected with the latch and operable to move the latch away from the distal end of the curved hook body in opening the hook mouth.

Further, the casing comprises a retaining groove disposed in an inside wall thereof. The tray comprises a clip extended from one side thereof and clamped on the memory chip package of the PC board, two spring arms extended from the clip in a parallel manner and pressed on the PC board, and an oblique retaining leaf obliquely extended from the clip between the two spring arms and engaged into the retaining groove of the casing.

Further, the casing is adapted for insertion into a USB port of a computer to electrically connect the USB interface circuit and memory chip package of the PC board to the computer for data access. Further, the hinge enables the safety hook to be turned relative to the casing within a limited angle. Further, by means of the safety hook, the USB memory stick can be fastened to an external object.

In an alternate form of the present invention, the USB memory stick comprises a casing, a PC board, a safety hook and a hinge. According to this second embodiment, the hinge comprises first and second barrels located at the top side of the casing, a third barrel located at the hook head of the safety hook and inserted into the gap between the first and second barrels and defining therein a small inner diameter portion and a large inner diameter portion, and a pivot shaft pivotally connecting the third barrel to the first and second barrels. The pivot shaft comprises a shaft body inserted through the first barrel, the third barrel and the second barrel and fitting the inner diameter of the second barrel and the small inner diameter portion of the third barrel, an expanded head located at one end of the shaft body and fitting the inner diameter of the first barrel and the large inner diameter portion of the third barrel, and a buck-tail located at the opposite end of the shaft body and bucked and secured to the second barrel. Further, a spring member is mounted on the shaft body within the large inner diameter portion of the third barrel and stopped between the expanded head of the pivot shaft and the small inner diameter portion of the third barrel to enhance torque, enabling the safety hook to be biased relative to the casing and then positively positioned at the desired position.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
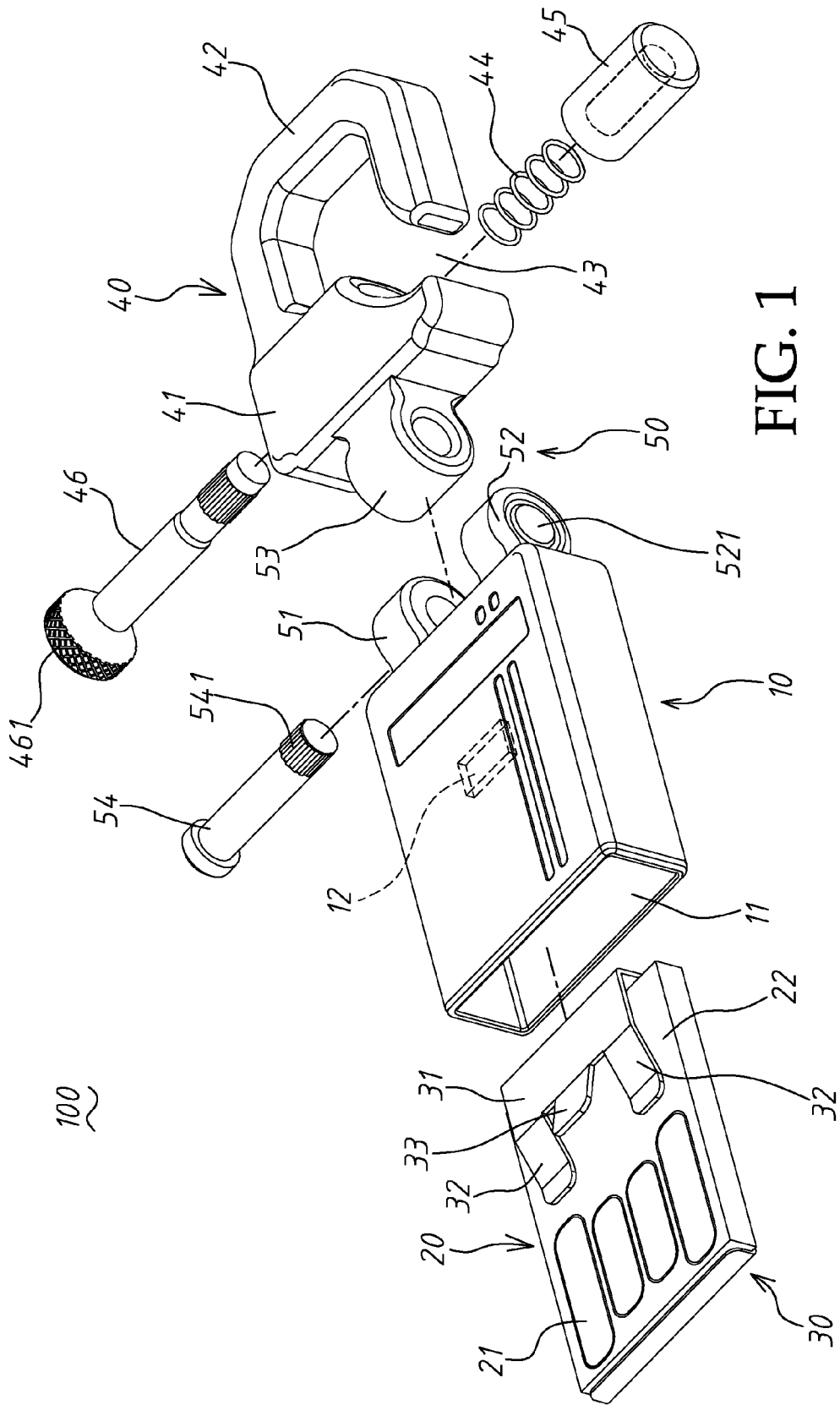
FIG. 1 is an exploded view of a USB memory stick in accordance with a first embodiment of the present invention.
Figure 2:
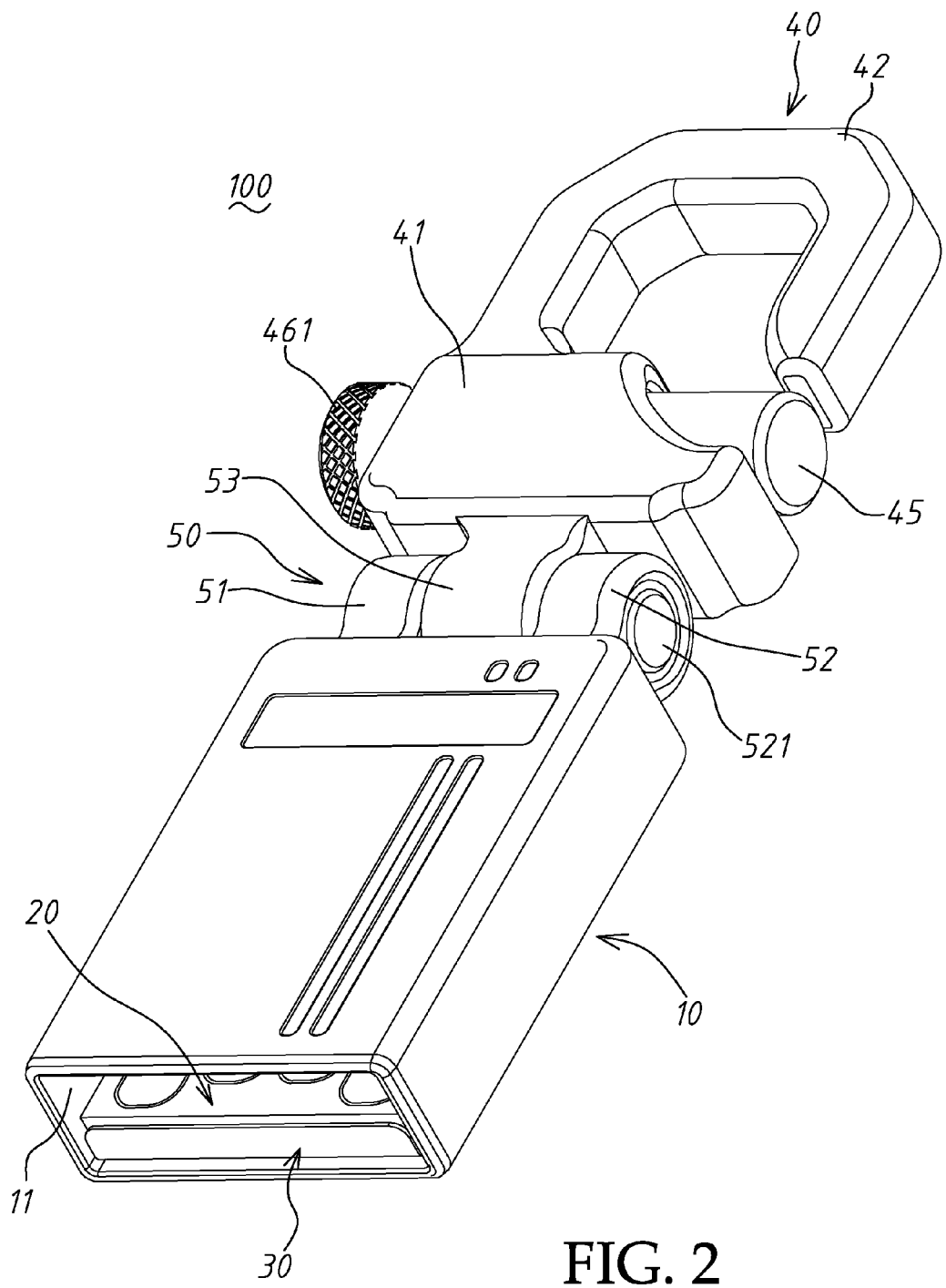
FIG. 2 is an elevational assembly view of the USB memory stick in accordance with the first embodiment of the present invention.

Referring to FIGS. 1 and 2, a USB memory stick in accordance with a first embodiment of the present invention is shown. The USB memory stick 100 comprises a casing 10, a PC board 20, a tray 30, a safety hook 40 and a hinge 50.

The casing 10 comprises a bottom opening 11 and a retaining groove 12 located on an inside wall thereof.

The PC board 20 comprises a USB interface circuit 21 and a memory chip package 22. Further, the PC board 20 is supported by the tray 30. The tray 30 is attached to the whole back side of the PC board 20, leaving the USB interface circuit 21 exposed to the outside.

Figures 3, 4:
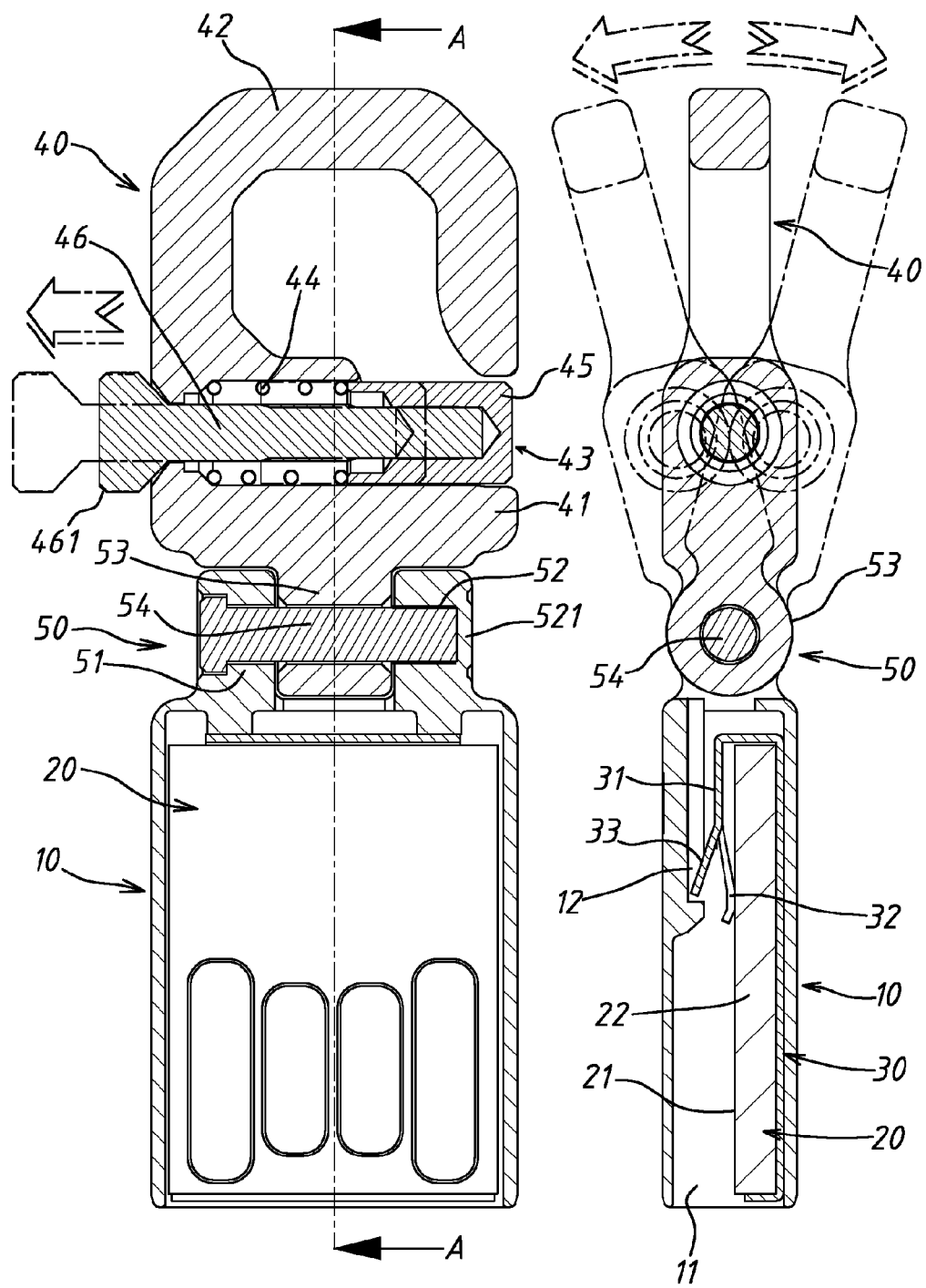
FIG. 3 is a longitudinal sectional view of the USB memory stick in accordance with the first embodiment of the present invention.
FIG. 4 is a sectional view taken along line A-A of FIG. 3.

The tray 30 comprises a clip 31 extended from one side thereof and clamped on the memory chip package 22 of the PC board 2, two spring arms 32 extended from the clip 31 in a parallel manner and pressed on the PC board 20, and an oblique retaining leaf 33 obliquely extended from the clip 31 between the two spring arms 32, which is engaged into the retaining groove 12 to secure the tray 30 in position after insertion of the tray 30 with the attached PC board 20 through the bottom opening 11 into the inside of the casing 10, as shown in FIG. 4. At this time, the USB interface circuit 21 is kept in the bottom opening 11 of the casing 10 accurately.

The safety hook 40 is located at the top side of the casing 10 opposite to the bottom opening 11, and adapted for fastening to a belt or strip-like object.

The safety hook 40 comprises a hollow hook head 41, a curved hook body 42 extended from one end of the hollow hook head 41, a hook mouth 43 defined between a distal end of the hollow hook head 41 and a distal end of the curved hook body 42, a coiled spring member 44 mounted inside the hollow hook head 41, a latch 45 supported on the coiled spring member 44 and stopped against the distal end of the curved hook body 42 to close the hook mouth 43, and an operating handle 46 slidably inserted through the coiled spring member 44 in the hook head 41 and fixedly connected with the latch 45. The operating handle 46 has an expanded handle head 461 disposed outside the hook head 41. As illustrated in FIG. 3, a user can pull the handle head 461 of the handle 46 to move the latch 45 away from the distal end of the curved hook body 42, thereby opening the hook mouth 43. When the user releases the hand from the handle head 461 of the handle 46, the latch 45 will be automatically moved back by the coiled spring member 44 into abutment against the distal end of the curved hook body 42, thereby closing the hook mouth 43.

Figure 5:
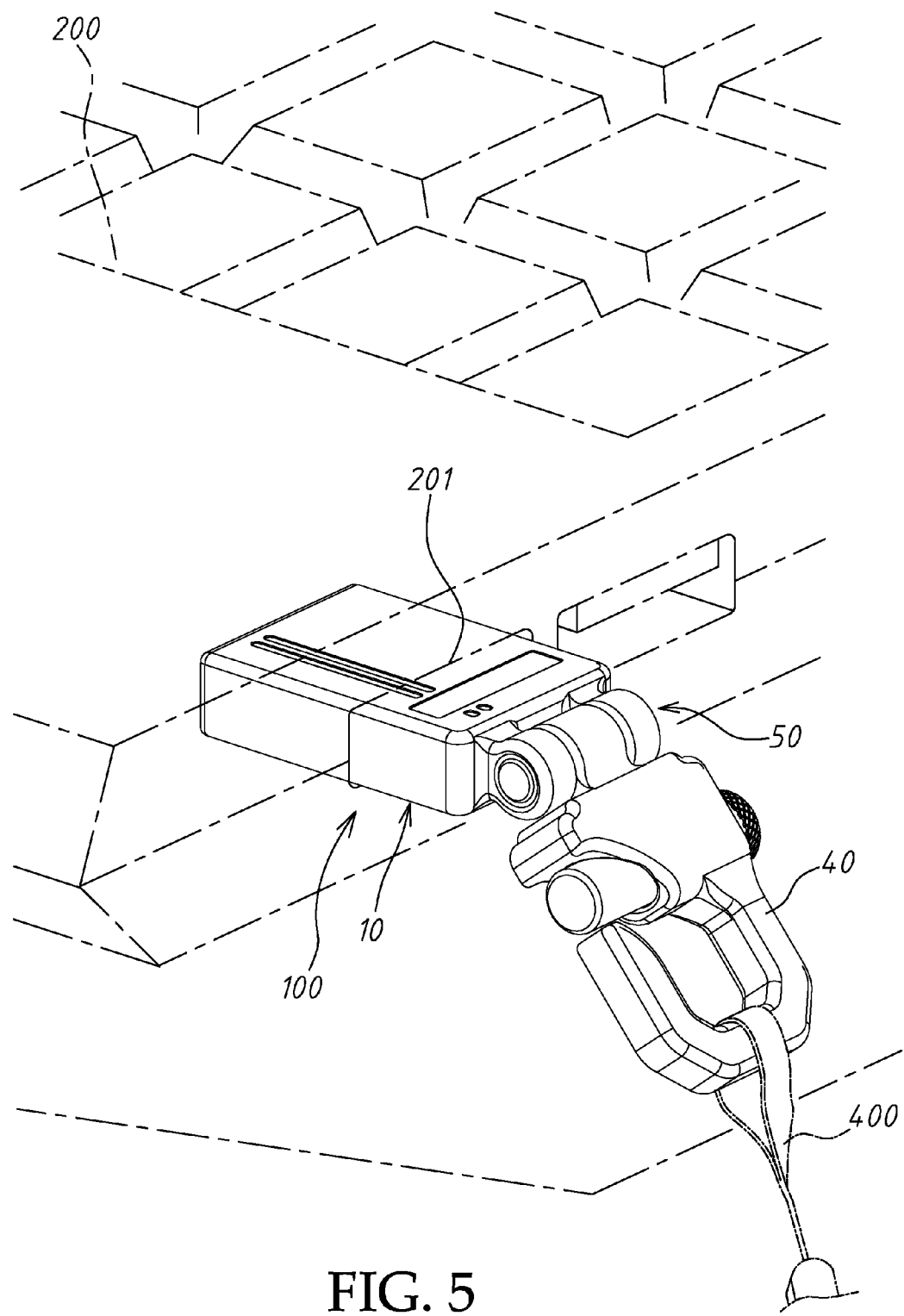
FIG. 5 is a schematic drawing illustrating an application example of the USB memory stick in accordance with the first embodiment of the present invention.

The hinge 50 is coupled between the casing 10 and the safety hook 40, allowing only a limited angle of rotation between the casing 10 and the safety hook 40, as illustrated in the imaginary arrowhead signs in FIG. 4 and FIG. 5.

The hinge 50 comprises first and second barrels 51 and 52 located at the top side of the casing 10, a third barrel 53 located at the hook head 41 of the safety hook 40 and inserted into the gap between the first and second barrels 51 and 52, and a pivot shaft 54 inserted through the first barrel 51 and the third barrel 53 into the inside of the second barrel 52 and secured thereto. The pivot shaft 54 has an embossed end portion 541 engaged with inside wall of the second barrel 52. The second barrel 52 has an end block 521 that stops the embossed end portion 541 of the pivot shaft 54 inside the second barrel 52. Thus, the safety hook 40 can be turned with the third barrel 53 about the pivot shaft 54 relative to the first and second barrels 51 and 52 and the casing 10 within a limited angle.

Referring to FIG. 5, the casing 10 is adapted for insertion into a USB port 201 of a computer 200 to electrically connect the USB interface circuit 21 and memory chip package 22 of the PC board 20 to the computer 200 for data access. Further, the hinge 50 enables the safety hook 40 to be turned relative to the casing 10 within a limited angle. Further, by means of the safety hook 40, the USB memory stick 100 can be fastened to an external object 400.

Figure 6:
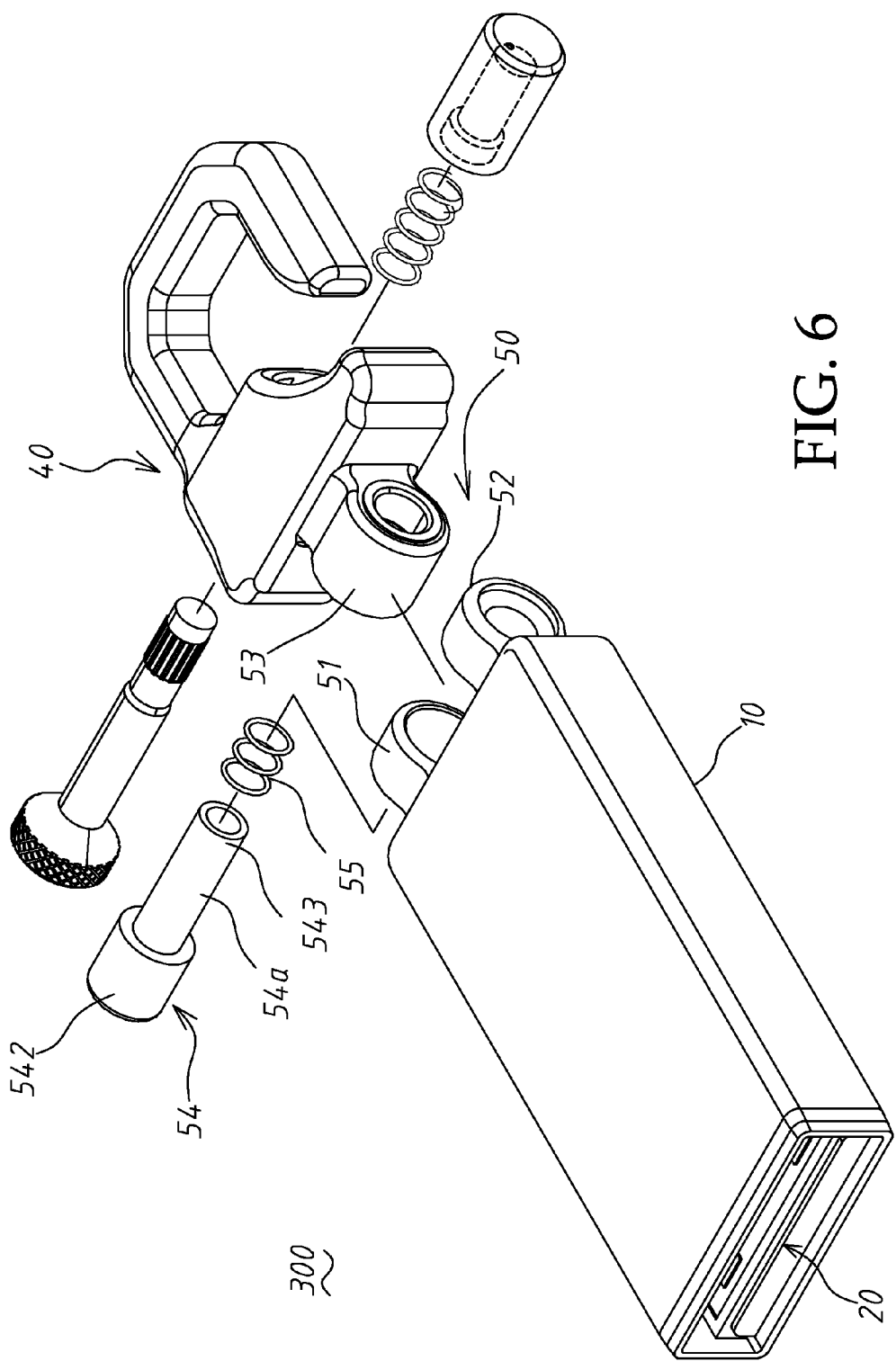
FIG. 6 is an exploded view of a USB memory stick in accordance with a second embodiment of the present invention.
Figures 7, 8:
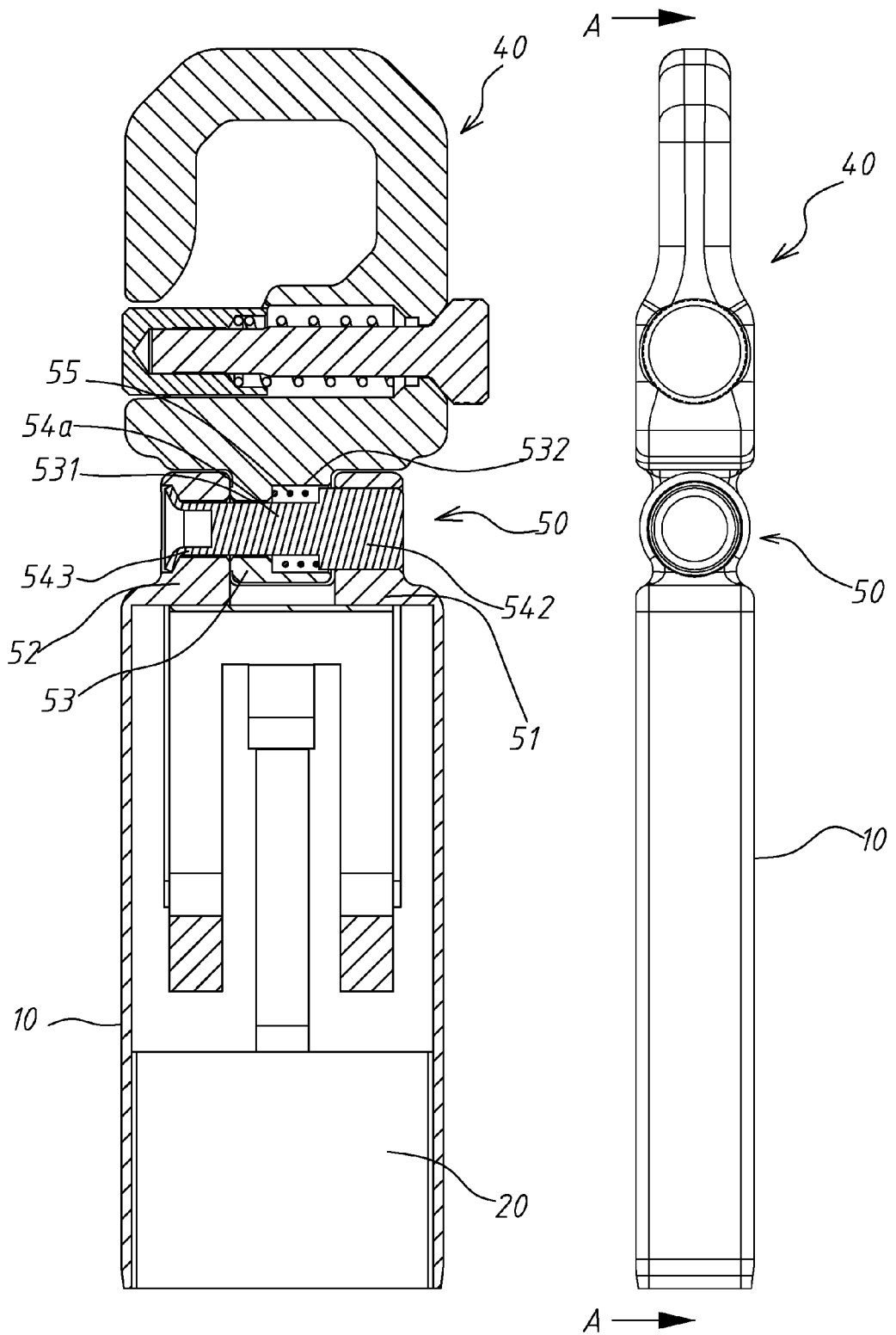
FIG. 7 is a side view of the USB memory stick in accordance with the second embodiment of the present invention.
FIG. 8 is a sectional view taken along line A-A of FIG. 7.

Referring to FIGS. 6-8, a USB memory stick 300 in accordance with a second embodiment of the present invention is shown. The USB memory stick 300 in accordance with the second embodiment of the present invention is substantially similar to the aforesaid first embodiment, comprising a casing 10, a PC board 20, a safety hook 40 and a hinge 50. According to this second embodiment, the hinge 50 comprises first and second barrels 51 and 52 located at the top side of the casing 10, a third barrel 53 located at the hook head 41 of the safety hook 40 and inserted into the gap between the first and second barrels 51 and 52 and defining therein a small inner diameter portion 531 and a large inner diameter portion 532, and a pivot shaft 54 pivotally connecting the third barrel 53 to the first and second barrels 51 and 52. The pivot shaft 54 comprises a shaft body 54a inserted through the first barrel 51, the third barrel 53 and the second barrel 52 and fitting the inner diameter of the second barrel 52 and the small inner diameter portion 531 of the third barrel 53, an expanded head 542 located at one end of the shaft body 54a and fitting the inner diameter of the first barrel 51 and the large inner diameter portion 532 of the third barrel 53, and a buck-tail 543 located at the opposite end of the shaft body 54a and bucked and secured to the second barrel 52. Further, a spring member 55 is mounted on the shaft body 54a within the large inner diameter portion 531 of the third barrel 53 and stopped between the expanded head 542 of the pivot shaft 54 and the small inner diameter portion 531 of the third barrel 53 to enhance torque, enabling the safety hook 40 be biased relative to the casing 10 and then positively positioned at the desired position.

Further, the design of the spring member 55 to enhance torque in the aforesaid second embodiment can also be used in the aforesaid first embodiment.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. A USB memory stick, comprising:
a casing comprising opposing top and bottom sides and a bottom opening in said bottom side;
a PC board comprising a USB interface circuit and a memory chip package;
a tray holding said PC board in said casing;
a safety hook for fastening to a belt or strip-like object; and
a hinge coupled between said casing and said safety hook for allowing a limited angle of rotation between said casing and said safety hook;
wherein said hinge comprises first and second barrels located at the top side of said casing, a third barrel located at said safety hook and inserted in between said first and second barrels, and a pivot shaft connecting said first and second barrels and said third barrel for allowing said third barrel to be turned with said safety hook relative to said casing within a predetermined angle.

2. The USB memory stick as claimed in claim 1, wherein said pivot shaft comprises an embossed end portion engaged in said second barrel.

3. The USB memory stick as claimed in claim 2, wherein said second barrel comprises an end block stopping against said embossed end portion of said pivot shaft.

4. The USB memory stick as claimed in claim 3, wherein said pivot shaft further comprises a shaft body and an expanded head located at one end of said shaft body; said embossed end portion is located at an opposite end of said shaft body; said first barrel has an inner diameter fitting the expanded head of said pivot shaft; said second barrel has an inner diameter fitting said shaft body and said embossed end portion.

5. The USB memory stick as claimed in claim 4, wherein said third barrel defines therein a large inner diameter portion equal to the diameter of said expanded head of said pivot shaft and the inner diameter of said first barrel, and a small inner diameter portion equal to the diameter of said shaft body and said embossed end portion of said pivot shaft and the diameter of said second barrel.

6. The USB memory stick as claimed in claim 1, wherein said safety hook comprises a hollow hook head, a curved hook body extended from one end of said hollow hook head, a hook mouth defined between a distal end of said hollow hook head and a distal end of said curved hook body, a coiled spring member mounted inside said hollow hook head, a latch supported on said coiled spring member and forced by said coiled spring member to stop against the distal end of said curved hook body to close the hook mouth, and an operating handle slidably inserted through said coiled spring member in said hook head and fixedly connected with said latch and operable to move said latch away from the distal end of said curved hook body in opening said hook mouth, said operating handle comprising an expanded handle head disposed outside said hook head.

7. A USB memory stick, comprising:
- a casing comprising opposing top and bottom sides and a bottom opening in said bottom side;
- a PC board comprising a USB interface circuit and a memory chip package;
- a tray holding said PC board in said casing;
- a safety hook for fastening to a belt or strip-like object; and
- a hinge coupled between said casing and said safety hook for allowing a limited angle of rotation between said casing and said safety hook;
- wherein said casing comprises a retaining groove disposed in an inside wall thereof; said tray comprises a clip extended from one side thereof and clamped on said memory chip package of said PC board, two spring arms extended from said clip in a parallel manner and pressed on said PC board, and an oblique retaining leaf obliquely extended from said clip between said two spring arms and engaged into said retaining groove of said casing.

8. The USB memory stick as claimed in claim 1, wherein said pivot shaft comprises a shaft body inserted through said first barrel, said third barrel and said second barrel, an expanded head located at one end of said shaft body and positioned in said first barrel, and a buck-tail located at an opposite end of said shaft body and bucked and secured to said second barrel.

9. The USB memory stick as claimed in claim 8, wherein said third barrel defines therein a small inner diameter portion fitting said shaft body of said pivot shaft, and a large inner diameter portion fitting said expanded head of said pivot shaft and accommodating a spring member, said spring member being mounted on said shaft body and stopped between said expanded head of said pivot shaft and said small inner diameter portion of said third barrel.

10. The USB memory stick as claimed in claim 7, wherein said safety hook comprises a hollow hook head, a curved hook body extended from one end of said hollow hook head, a hook mouth defined between a distal end of said hollow hook head and a distal end of said curved hook body, a coiled spring member mounted inside said hollow hook head, a latch supported on said coiled spring member and forced by said coiled spring member to stop against the distal end of said curved hook body to close the hook mouth, and an operating handle slidably inserted through said coiled spring member in said hook head and fixedly connected with said latch and operable to move said latch away from the distal end of said curved hook body in opening said hook mouth, said operating handle comprising an expanded handle head disposed outside said hook head.

\* \* \* \* \*